United States Patent
Ericson et al.

(10) Patent No.: US 7,094,977 B2
(45) Date of Patent: Aug. 22, 2006

(54) METHOD AND SYSTEM FOR INFORMATION ASSOCIATION

(75) Inventors: Petter Ericson, Malmö (SE); Ida Westerberg, Malmö (SE); Kristofer Skantze, Lund (SE); Jan B. Andersson, Sunny Vale, CA (US); Stefan Burström, Lund (SE)

(73) Assignee: Anoto IP LIC Handelsbolag, Lund (SE)

( * ) Notice: Subject to any disclaimer, the term of this patent is extended or adjusted under 35 U.S.C. 154(b) by 809 days.

(21) Appl. No.: 09/826,015

(22) Filed: Apr. 5, 2001

(65) Prior Publication Data

US 2002/0011989 A1    Jan. 31, 2002

Related U.S. Application Data

(60) Provisional application No. 60/261,922, filed on Jan. 16, 2001, provisional application No. 60/261,121, filed on Jan. 12, 2001, provisional application No. 60/210,652, filed on Jun. 9, 2000.

(30) Foreign Application Priority Data

| Apr. 5, 2000 | (SE) | .................................... 0001253 |
| Sep. 7, 2000 | (SE) | .................................... 0003195 |
| Nov. 13, 2000 | (SE) | .................................... 0004157 |

(51) Int. Cl.
  *G06K 11/06* (2006.01)
(52) U.S. Cl. .................... 178/18.01; 345/179
(58) Field of Classification Search ............... 235/487;
  178/18, 19, 18.01, 18.02, 19.01, 19.02, 18.04,
  178/18.09, 18.07, 19.03; 345/179, 181, 182,
  345/183, 173, 156, 157, 175, 178, 165, 174;
  340/710; 341/13, 20, 15, 32, 33
See application file for complete search history.

(56) References Cited

U.S. PATENT DOCUMENTS

| 5,051,736 A |   | 9/1991 | Bennett et al. ............. 340/707 |
| 5,157,737 A | * | 10/1992 | Sklarew ....................... 382/315 |
| 5,477,012 A | * | 12/1995 | Sekendur ................. 178/18.09 |
| 5,652,412 A | * | 7/1997 | Lazzouni et al. ........ 178/18.01 |
| 5,661,506 A | * | 8/1997 | Lazzouni et al. ........... 345/179 |
| 5,852,434 A | * | 12/1998 | Sekendur .................... 345/179 |

(Continued)

FOREIGN PATENT DOCUMENTS

GB      2306669      5/1997

(Continued)

*Primary Examiner*—Bipin Shalwala
*Assistant Examiner*—Nitin Patel
(74) *Attorney, Agent, or Firm*—Birch, Stewart, Kolasch and Birch, LLP

(57) ABSTRACT

Method and system for information association based on an absolute position coding pattern comprising dots or markings which codes coordinates for a position on an imaginary surface. The imaginary surface comprises several regions which are divided in areas, each defined by said coordinates. Handwritten information is digitized by a handheld device which is moved over a surface provided with said pattern and acts like a pen to make notes on the surface. At the same time, the pattern is sensed and coordinates for the pen is calculated regularly. By passing the handheld device over the borderline between areas having different coordinates, a hyperline is generated having a discontinuity. Such a hyperline is easily recognized by the computer system and is used for connecting information at different areas, giving information some properties, like color, or performing an action on the information, such as encryption, or transferring the information to a recipient.

32 Claims, 5 Drawing Sheets

U.S. PATENT DOCUMENTS 6,330,976 B1 * 12/2001 Dymetman et al. ......... 235/487
2001/0038383 A1 11/2001 Ericson et al. .............. 345/173

FOREIGN PATENT DOCUMENTS

| WO | WO9950787 | 10/1999 |
| WO | WO0072244 | 11/2000 |
| WO | WO01/16691 A1 | 3/2001 |
| WO | WO0122208 | 3/2001 |
| WO | WO0126032 | 4/2001 |

* cited by examiner

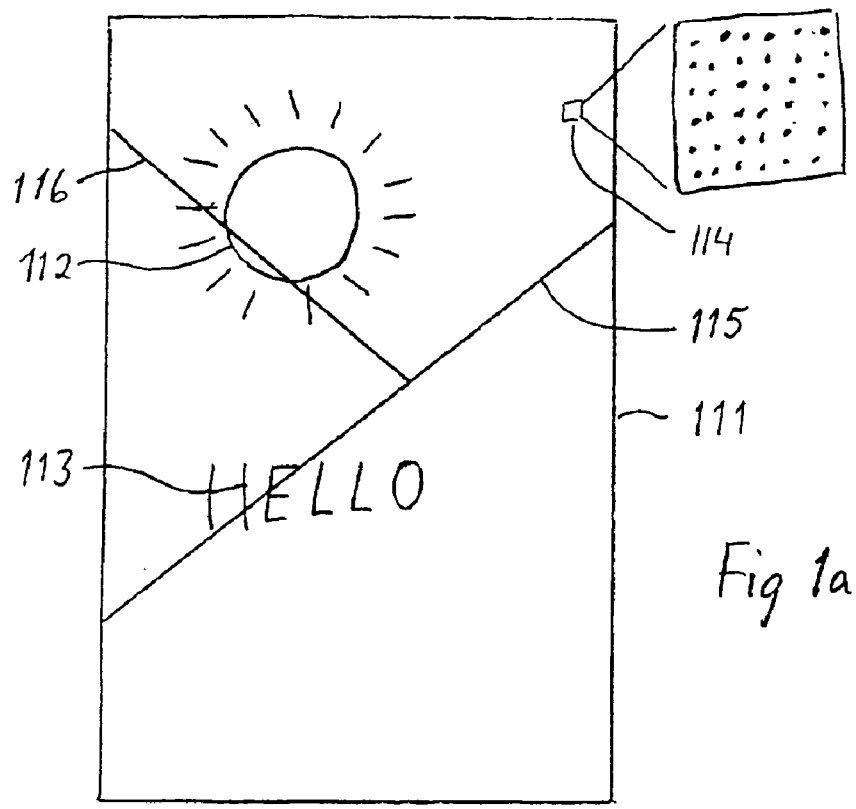
Fig 1a
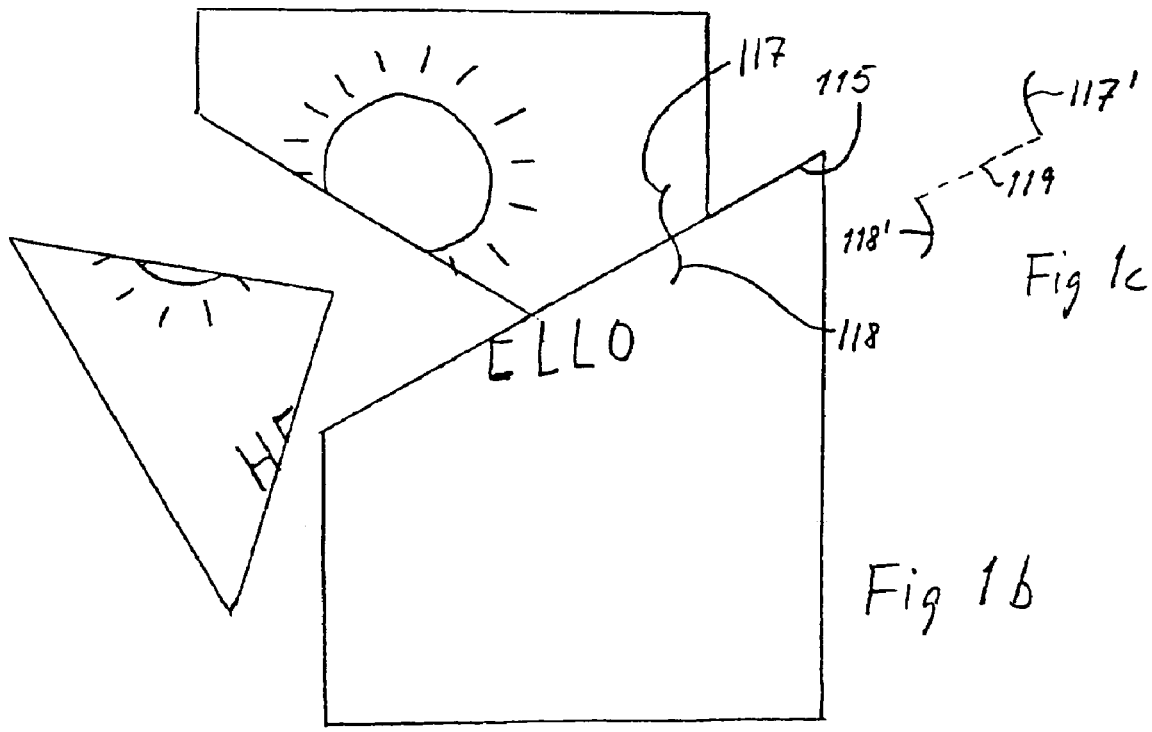
Fig 1c
Fig 1b

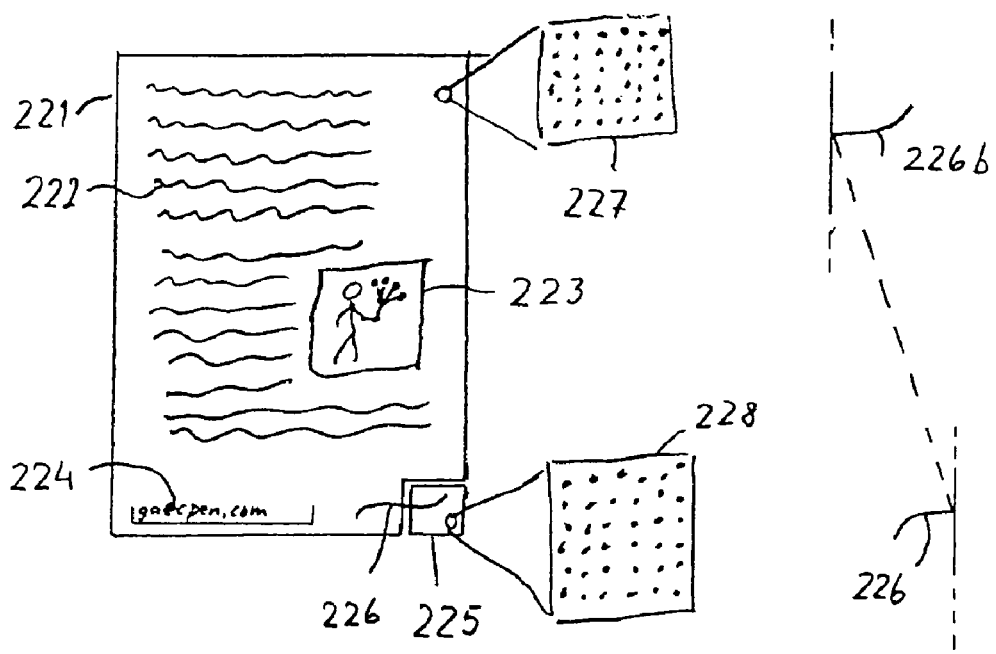
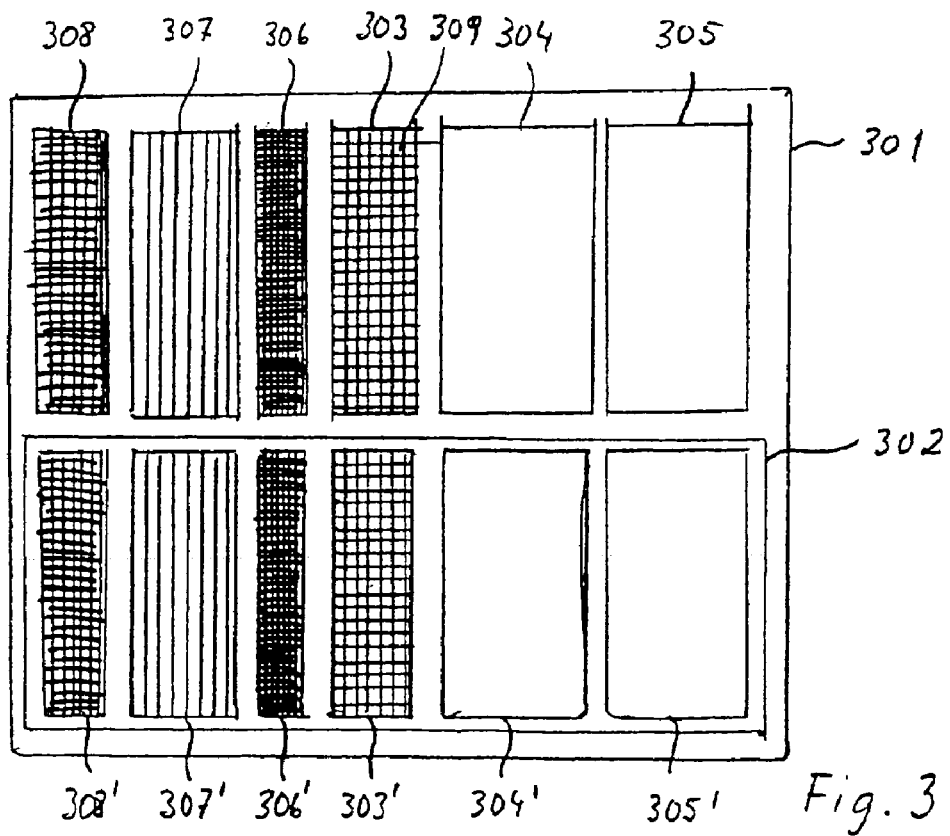

METHOD AND SYSTEM FOR INFORMATION ASSOCIATION

This application claims priority benefits based on Swedish Patent application Nos. 0001253-4 filed Apr. 5, 2000, 0003195-5 filed Sep. 7, 2000, and 0004157-4 filed Nov. 13, 2000, and U.S. provisional Application Nos. 60/210,652 filed Jun. 9, 2000, 60/261,922 filed Jan. 16, 2001, and 60/261,121 filed Jan. 12, 2001, the disclosure of all which are hereby incorporated herein by reference in their entirely.

AREA OF INVENTION

The present invention relates to a method and system for information association and more particular to association of information written by hand and converted to digital format by a handheld device.

BACKGROUND ART

Information has been noted for hand by pen on paper since several hundreds of years. However, paperbased information has drawbacks, such as being permanent and difficult to change and distribute.

Recently, in personal computers, information may be entered by keyboards and displayed by display devices, like CRT or LCD screens. However, computerbased information has drawbacks, such as being difficult to enter by keyboards and difficult to read on a computer screen.

Several suggestions exists for digitizing handwritten information for transferring such handwritten information to digital devices, such as computers.

As soon as the information has been entered in the computer, it may be communicated to others, such as by e-mail or SMS or via an Internet connection or as a fax via a fax modem.

In a computer context, a mouse is often used for selecting information and acting upon such selected information. A typical situation involves draging a mouse pointer over characters of information displayed on the screen to select said information. Then, the mouse pointer is pointed at a certain position on the screen, such as in a menue system or pallette, in order to initiate certain actions to be performed upon the selected text, such as changing the font type or size.

The same type of selection may be performed in the pen and paper situation, such as encircling a piece of information or yellow-mark information. However, since the information is fixed, no action can normally be taken upon the selected information, which however, may be highlighted to the reader.

Patent Application No. PCT/SE00/01895, filed by applicant, the technical disclosure of which is incorporated herein by reference, discloses a system in which a handheld device and a paper is used for jotting down information in a traditional way, whereby at the same time is generated a digital graph comprising one or several traces of lines of the movement of the pen over the paper, which graph may be transferred to a computer. In such a system, the advantages of using a pen and paper, which many users prefer, is combined with the flexibility of the computer to communicate and store the information to obtain the best of the two worlds. In this patent application, the paper is provided with an absolute position coding pattern, comprising dots or markings. The handheld device includes an optical sensor which registers the pattern. A mathematical algorithm calculates the absolute position in the form of coordinates for the position of the handheld device by means of the absolute positon coding pattern.

The traditional pen is in this way tranformed into an input means for the computer and the computer may be used for storing the information instead of or in combination with arranging the paper in a binder. Moreover, the information may be communicated by means of the computer. However, the information inserted by this input method is graphical and not in character coded format, which the computer is more apt to.

The information included in the graphical input comprises information which may be used for different purposes:

1) The information comprises a picture, like drawings or lines with a mutual relationship, which may be interpreted by the human being, such as characters, symbols, or a drawing. This is the very information which is put down on the paper and which the user wants to be treated in one or the other way, such as being archived or being sent to a recepient. This information is below called message information and is stored in a graphical format such as a vector format or as a collection of pixels.

2) The portion of the message information which comprises handwritten characters, can be exposed to further treatment, such as character recognition (OCR, optical character recognition or ICR, intelligent character recognition) for converting the information to a character format, such as ASCII, which may be used by the computer, e.g. for searching purposes or for cataloging. Also symbols, such as shorthand symbols or icons, may be recognized which by the user has been predefined to have a certain meaning. This information is below called character information.

3) The information may further comprise an indentification of the handheld device which is used for writing the information. The identification of the handheld device is below called pen-ID.

4) Furthermore, there is information on where at the surface the information was jotted down, so called absolute position information.

5) There may be further information, such as time information obtained from an internal clock, pressure information from a pressure sensor about the pressure of the handheld device towards the paper, and angle information about the angle between the handheld device and the paper. From the time information, speed and acceleration of the handheld device may be calculated.

The present invention is mainly focused on the information of type 4) and 5) above, such as absolute position information.

There are further known systems for obtaining absolute position information in a pen and paper system, see for example U.S. Pat. No. 5,882,434 and U.S. Pat. No. 5,051,736. Such previously known systems describe use of such information for digitizing message information, i.e. group 1) indicated above.

The information may be used in different places in the system so far described. The handheld device may comprise a picture sensor and a processor with associated memory and an energy source such as a battery. Moreover, there may be a communication device, such as a wire or a connection to a computer or an IR link or a shortrange radio connection. There is also a pressure sensor which senses if the handheld device is applied to the paper and the pressure between the handheld device and paper.

It is possible to transfer the information from the handheld device to an external computer in the nature of a video signal from the sensor and all computing taking place in the external computer. Alternatively, the handheld device may be provided with means for image processing. Thus, the handheld device may be provided with a processor and/or logic arrays, which processes the video signal obtained from the sensor and calculates the absolute position from the dots or markings imaged from the surface of the paper. This image processing comprises adjustments for perspective effects from rotation and inclination of the handheld device in relation to the paper and compensation for different light conditions. The handheld device may further comprise computer programs which calculates the x-y-coordinates of the handheld device on an imaginary surface.

Information may be stored in the memory of the handheld device in the nature of a coordinate train, which may be converted to a vector format. This message information may be transferred to a computer, which draws a graph on the screen of the computer by means of a computer program. The message information may be sent to a local or distant printer for direct printout or to a dumb display device which only has the ability to draw the graph at the screen, such as a TV screen.

Interpretation of the message information to a character format may take place in the handheld device or in a computer system.

In addition to coordinate information there is also time information, such as time information for each coordinate, which is recorded each hundredth of a second when the pressure sensor is activated. Moreover, there may be information about the pressure towards the support and inclination and rotation information for the position of the handheld device in relation to the support.

Message information may be communicated to a recepient in the nature of a fax or an e-mail. In this situation, the handheld device may cooperate with a mobile telephone via a wire, IR or radio link. The mobile telephone may operate as a "modem" for transferring the message information to a telefax apparatus at a telefax number, or to Internet via calling a modem pool of an Internet operator. In this case, it may be required that certain portions of the message information is character recognized, which may take place in the handheld device. Such recognized information may be used as a telefax number or an IP address for communication via Internet. Address information in the mobile telephone may alternatively be used.

The computer may perform the same functions as described above as performed in the handheld device.

The information may be transferred to a server via Internet at a preprogrammed IP address and the character recognition may take place in said server.

In the above situations, it may be desired to use the input device, i.e. the handheld device for selecting certain text and indicate some actions to be performed on such information. Actions may be qualifying actions, such as qualifiying certain properties of the selected information, such as color or line thickness etc. Actions may also be operations to be performed on the selected information, such as character recognition or encryption. Other types of actions may be to expose the information for a program for encapsulating the information to a e-mail standard format to be transmitted as an e-mail. Further types of actions may be to compile the selected information in a binder or folder in a computer file system, as further described below.

Thus, there is a need for a method and a system for associating information with other information, actions or qualifications.

DISCLOSURE OF THE INVENTION

A first object of the invention is to use absolute position coordinates for providing a method and a system for associating information as described above to make such association simple and intuitive.

A second object of the invention is to provide a method and system for digitizing handwritten information by means of a handheld device and associating other information, actions or qualifications to said information by using said handheld device.

A third object of the invention is to provide a method and a system as described above, which takes advantages of an absolute postion coding pattern, which codes coordinates for a postion of the handheld device.

A fourth object of the invention is to provide a method and system for providing a partly discontinuous absolute position coding pattern, whereby the discontinuity is used for said association.

According to an aspect of the invention, there is provided a method and system for generating an association with regard to information, which is arranged on at least one support provided with an absolute position coding pattern and by means of a handheld device arranged to sense said absolute position coding pattern. The handheld device is passed over said support for sensing said absolute position coding pattern. When it is sensed that the handheld device passes over a discontinuity in the absolute position coding pattern such discontinuity is interpreted as an association regarding the information present on said support.

The support may comprise a first area in which said absolute position coding pattern codes continuous first coordinates. The information is provided on the first area and is connected to the first coordinates. Moreover, the support comprises a second area provided with an absolute position coding pattern which codes second coordinates which are discontinuous with the first coordinates. When the handheld device is passed in a single movement from one area to the other area, the discontinuity is sensed.

The association may involve that a predetermined action is undertaken on the information, such as sending the information as a message, such as an e-mail, SMS or fax, to a recipient. The recipient may be defined in the information or be defined by the association. In the last case, the recipient may be defined by the coordinates in said second area, which coordinates are connected to information about the recipient.

The association may involve that the information is stored at a predetermined location in a computer system. Such location may be a predetermined folder in a personal computer defined by the coordinates of the second area.

The association may involve that an operation may be performed on the information, such as encryption or character recognition.

The association may involve that a qualification is imposed on the information. Such qualification may be underline, color, line width, yellow mark, secret, personal, etc.

The information which it to be qualified may be selected by passing the handheld device from the second area, to the first area and encircling the information to be qualified and possibly back again to the second area.

The association may involve that first information in a first area is connected to second information in a second area into a single information.

The association may be over more than two areas, multiple association. Thus, the handheld device is passed over three or more areas having discontinuous coordinates for associating three or more information, actions or qualifications.

Other objects, features and advantages of the invention appears from the detailed description of the invention given below with reference to embodiments of the invention shown on the drawings.

SHORT DESCRIPTION OF THE DRAWINGS

FIG. 1a is a schematic diagram of a page according to the invention having a drawing and text made by hand.

FIG. 1b is a schematic diagram of the page of FIG. 1 separated into three pieces.

FIG. 1c is a schematic diagram of a line drawn over two separated and offset pieces of the page of FIG. 1b.

FIG. 2a is a schematic diagram of a page provided with a send line.

FIG. 2b is a schematic diagram of the digital representation of the send line in FIG. 2a.

FIG. 3 is a schematic diagram of an imaginary surface divided in several regions.

DETAILED DESCRIPTION OF EMBODIMENTS

Figure 4:
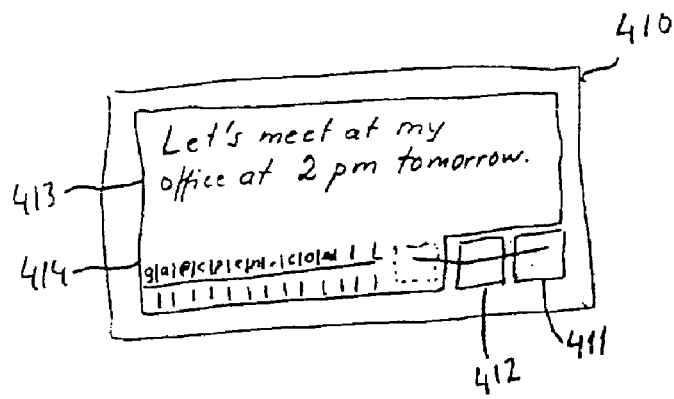
FIG. 4 is a schematic diagram similar to FIG. 3a of a business card provided with a send line.

FIG. 1a discloses a paper page 111 provided with a drawing 112 of a sun and a text 113, "HELLO" all drawn by hand by a pen on the paper.

The paper is provided with an absolute position coding pattern as indicated in the small square 114 which is enlarged to the right. The square is provided with several dots arranged in a pattern as described in more detail below. Although only square 114 is shown with the absolute position coding pattern, the entire page is provided with such a pattern. The pattern is more or less invisible for the naked eye, since the dots are small, such as having a diameter of 0.08 mm, and arranged at a small distance from each other, such as 0.3 mm. The pattern is used for digitizing the movement of the pen over the paper. The pen is provided with an optical sensor which images the dots. A computer in the pen calculates x-y-coordinates from the image and the arrangements of the dots, as described below. Thus, a digital representation of the drawing 12, the sun, and the text 13, "HELLO", is provided.

The page is divided in three parts by lines 115,116. FIG. 1b shows the page separated into three pieces. The three pieces may now be handled separately and moved to different locations. However, the pen and the digitalization system is unaware of the fact that the page is separated. If the pen draws a new line 117,118 from one of the pieces to another of the pieces, which is offset from the first piece, the physical continuous line 117,118 on the page is represented in the digital world as a discontinuous line 117',118' as shown in FIG. 1c. The discontinuity 119 represents the displacement of the two pieces in relation to each other.

According to the invention, the concept of a continuous physical line which is represented as a digital discontinuous line is used for generating associations between information. Such a continuous physical, discontinuous digital line is called a hyper-line.

FIG. 2 shows a simple example of this concept. A note book paper 221 is provided with a text 222 and a drawing 223 as well as address information 224, ga@cpen.com. The page is provided with a code pattern over the entire side, as shown by enlargement 227.

Moreover, the page comprises a send button 226, which also is provided with an absolute position coding pattern 225, however, discontinuous from the code pattern of the rest of the page.

The page is provided with text and drawing at a suitable time, such as during a lecture in a classroom. The address information is also inserted. The information is jotted down by a handheld device, such as a digital pen, which at the same time accumulates the positions which the pen assumes and form a digital representation of the information, which may be stored in the memory of the handheld device.

When the page is completed, the user may want to send the page as an e-mail to the address indicated. He then draws a hyperline 226 joining the send button 225 with the paper 221. The digital pen is provided with a program which recognizes a hyperline and starts a program whenever a hyperline is drawn. The program looks at the coordinates included in the two portions of the hyperline. In this case the hyperline starts in paper area 221 and ends in the send box 225, but the opposite is also possible. The end 226b of the hyperline comprises coordinates from an area separate from the page 221. The program interprets these coordinates as an instruction to send an e-mail with the information included in an area defined by the rest of the line 226a. The area defined by the rest of the line, is the entire page 221. Thus, an association between the paper area 221 and the send box 225 is obtained by the hyperline 226, which defines an action to be undertaken on page 221.

In order to further clarify how associations may be generated by hyperlines according to the invention, a further description of the absolute position coding pattern and the use thereof may be required, with reference to FIG. 3.

The absolute position coding pattern may comprise dots arranged adjacent crossing points of a rectangular raster, having perpendicular raster lines with a distance of 0,3 mm. The dots are displaced from the crossing points by a small distance, such as one sixth of the distance between the lines and in the direction of the lines. Such displacement indicates a value for each dot. Since there are four displacement directions, each dot may represent four values, "0", "1", "2", "3". The raster may be virtual, in the sense that it is only used as a help for defining the positions of the dots. It is not printed on the surface together with the dots and is thus invisible.

If an optical sensor of the pen images a surface square comprising 6*6 dots, these 36 dots may represent a numeral which may have 4^36 different values, since each dot may have four different values, as explained above.

These 36 dots are arranged to define coordinates for a position of this set of dots on an imaginary surface, which may be very large. The coding is floating in the sense that each dot may take part in several squares of 6*6 dots. Such an imaginary surface is schematically depicted in FIG. 3.

This large imaginary surface 301 may be divided in regions, each having assigned separate properties or uses. Thus, in FIG. 3 there is shown a note book region 303, a common region 304, an application region 305, a business card region 306, a diary region 307 and a send box region 308. Moreover, there may be a local sync region 302, which is divided in several sub regions, such as a send box region 308', a diary region 307', a business card region 306', a note book region 303', a common region 304' and an application region 305'.

As clearly shown in the note book region 303, the region is divided in several areas 309, each of a predefined size.

In order to give an example, it is supposed that the total imaginary surface comprises x-y-coordinates of a binary type, i.e. defined by zeros and ones. The coordinates has a length of 36 bits for each of the x-coordinates and y-coordinates and codes a surface having $2^{36}$ positions.

The different regions may be dedicated for different operations or functions. In the example, the send region 308 is dedicated to be used when generating a send command to the pen. For example, the send region may be defined as the region in which all coordinates start with x=0001 . . . and y=0001 . . . To be more general, each region may be defined by the first four bits of each of the x- and y-coordinates. In this manner, 256 regions may be defined. Only 6 regions are shown in FIG. 3.

As shown in the note book region 303, the region is divided in a number of equally large areas 309. Suppose that each such area is slightly above 1 square meter, 12 bits are required for defining this surface with a resolution of 0.3 mm (0.3 mm * $2^{12}$=1228.9 mm). Thus, the last twelve bits are used for defining the position inside the note book page area. The remaining twenty bits, (36−4−12=20) are used for defining the specific page area in the note book region. Thus, $4^{20}$ different page areas may be defined, which means 1 099 511 627 776.

The send box region 308 is divided in still smaller areas comprising 19.2 mm*19.2 mm, which corresponds to 6 bits. Thus, the total number of send areas that may be defined is $4^{26}$=4 503 599 627 370 496.

In FIG. 3, the areas are shown as rectangular areas having no overlap. The areas may have any shape. It is also possible to have regions and areas which overlap, but are separated by mathematical algorithms.

Information about the imaginary surface and the extent of the regions are stored in the system, in one or several computer systems, as described in more detail below.

The absolute position coding pattern, which defines the coordinates for the above positions, may be applied at any product, such as paper, plastics, etc. It may also be integrated or applied to a computer screen. In the following, a product provided with such a pattern is called "digital paper".

This coding pattern as well as a handheld device, such as a pen, is disclosed in WO 01/16691, the technical disclosure of which is incorporated herein by reference.

The pen may comprise a program which makes it possible to differentiate between information which is to be stored in the pen, information which should be transferred to the computer of the user, and information which should be sent to a fax number or via a modem or that should be sent to a server at a predetermined IP address. Thus, a certain region comprising a predetermined set of coordinates may be dedicated to be transferred to a specific recipient, for example, information written in the diary area 307 is always transferred to a calender program in the users personal computer or computer system. Another example is that all information written in the local sync region 302 is transferred to the users personal computer via a local sync operation and program.

Thus, the pen and the computer system may have information about what the different regions at the imaginary surface are dedicated for. No specific component of the system needs to have full information about all the different regions, but such information may be distributed over several units.

FIG. 4 discloses a business card 410 which is arranged to use the present concept of a hyperline. Only the backside of the card is shown in FIG. 4. Each human being may be assigned his own area in the business card region 306, comprising coordinates privately owned by him. The assignment is registered in several servers, for example one per country. The IP addresses to these servers are stored in a central server. The coordinates of this private business area is coded on the backside of the business card in a personal box 411. Coordinates from an send area from the send region 308 is coded in a send box 412. Finally coordinates from a common area 304 is coded on the rest of the business card.

When using this business card for the purpose of sending information, the user writes a message on the backside of the business card in area 413, such as "Let's meet at my office at 2 pm tomorrow". He than indicates the e-mail address of the recipient in the address field 414. Finally, he draws a hyperline which passes from the area 413, through area 412 to area 411. This hyperline is interpreted by the pen program to send an e-mail with the message to the indicated address with the business card owner as sender, and possibly also a copy to the business card owner. It is realized that area 413 taken from the common area may be replaced by the private coordinates, whereby box 411 is superfluous.

Moreover, it is possible to use the pen-ID, in order to replace the address indication. This is done by writing with the users pen on the recipients business card. Then the system is programmed to send the message to the owner of the business card with the owner of the pen as sender.

It is realized that the server which holds the information of the private business area distribution may also comprise all details of the business card owner, so that a pen owner may obtain all such information only by making a marking at the personal box 411. Further variants are possible as disclosed in Swedish Patent Application No. 0003195-5, filed Sep. 7, 2000, the technical disclosure of which is included herein by reference.

Figure 5:
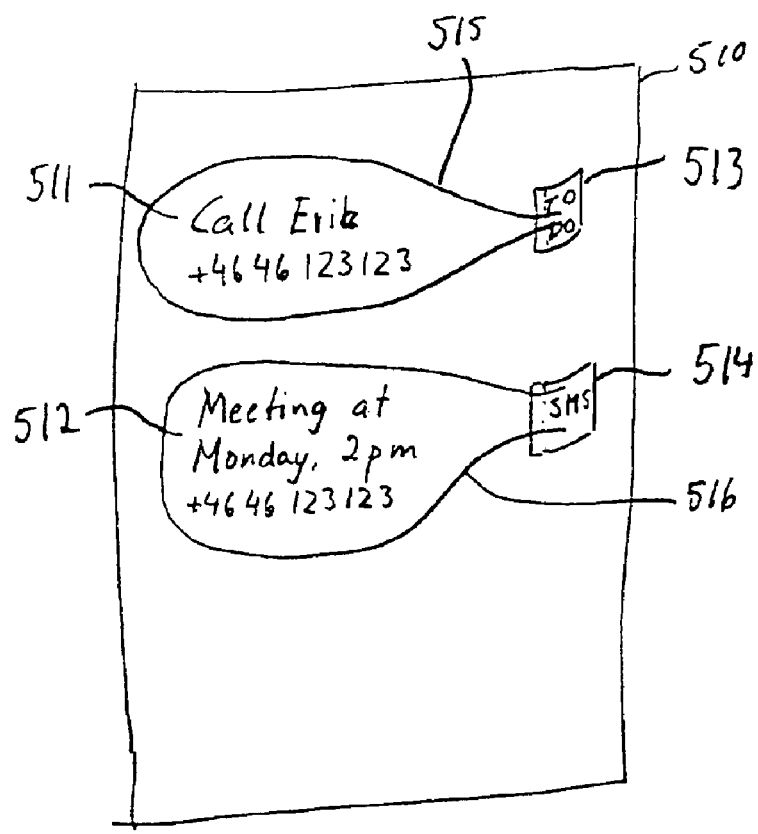
FIG. 5 is a schematic diagram of a page provided with two messages and two labels.

FIG. 5 dicloses a somewhat different use of association. A page 510 is provided with an absolute position coding pattern over the entire surface. Two messages 511 "Call Eric +46 46 123 123" and 512 "Meeting at Monday, 2 pm +46 46 123 123" are drawn by hand with a handheld device according to the invention. The user has a number of labels 513,514, each having its own coordinates arranged thereon. The label is provided with an adhesive at at least a portion of the backside, and may be adhered to the page 510 where desired. The label may include printings which tells the operation which the label is associating to the information, such as TO DO and SMS.

A hyperline 515 is drawn from the label 513 and encircling message 511 and returning to the lable 513. The information encircled by the hyperline is then associated the function of the label. In this case the information is transferred to the owners computer and inserted in a to-do-list.

Another hyperline 516 is drawn from the second label 514 and encircling the second message 512 and back to the label. The information encircled by the hyperline is then associated the function of the label. In this case the message is sent as a SMS to the telephone number indicated in the message.

Figure 7:
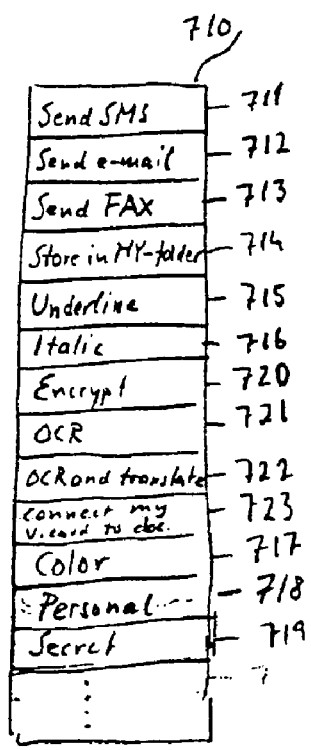
FIG. 7 is a schematic diagram of a ruler provided with boxes corresponding to different associations.

The labels may be replaced by a ruler, as shown in FIG. 7 including several separate areas, each representing a function or a qualification. Thus, ruler 710 is provided with an area for sending a SMS 711, an area for sending an e-mail 712, an area for sending a fax 713, an area for storing the information in a specific folder called MY-folder 714. Moreover, the information may be qualified in different respects by a hyperline, and the ruler includes qualifiers such as an area for underline 715, an area for italic 716, an area for color 717, an area for personal 718, an area for secret 719. Moreover, there may be associations for certain operations, such as an area for encryption 720, an area for character recognition 721, and an area for character recognition and translation to a predefined language 722. Finally, there is an association for connection of the users v.card information to the document 723. Further areas may be arranged such as further folders and further v.card information areas for different persons, such as collegues.

The ruler is placed adjacent a page comprising the information which should be associated according to the present invention, and a hyperline is drawn from the ruler area to the information.

The information may be encircled as mentioned in relation to FIG. 5. Alternatively, the entire contents of the page in the case of a note book page as mentioned above, may be included as the message.

Another use of the ruler is that the ruler is placed adjacent a paper comprising an absolute position coding pattern coding coordinates which are linked to information appearing at the page. Such an example is a printed book provided with such a pattern. When a paragraph is encircled in said book and associated with the area 714, Store in MY folder, the pen is arranged to start a program which looks up which publisher has printed the book, which is defined by the coordinates, and contacts the server of this publisher, and gives the exact coordinates of the encircled paragraph. The publisher has this paragraph in ASCII format in his server and sends this paragraph to the recipient as defined by the pen-ID.

Figure 6:
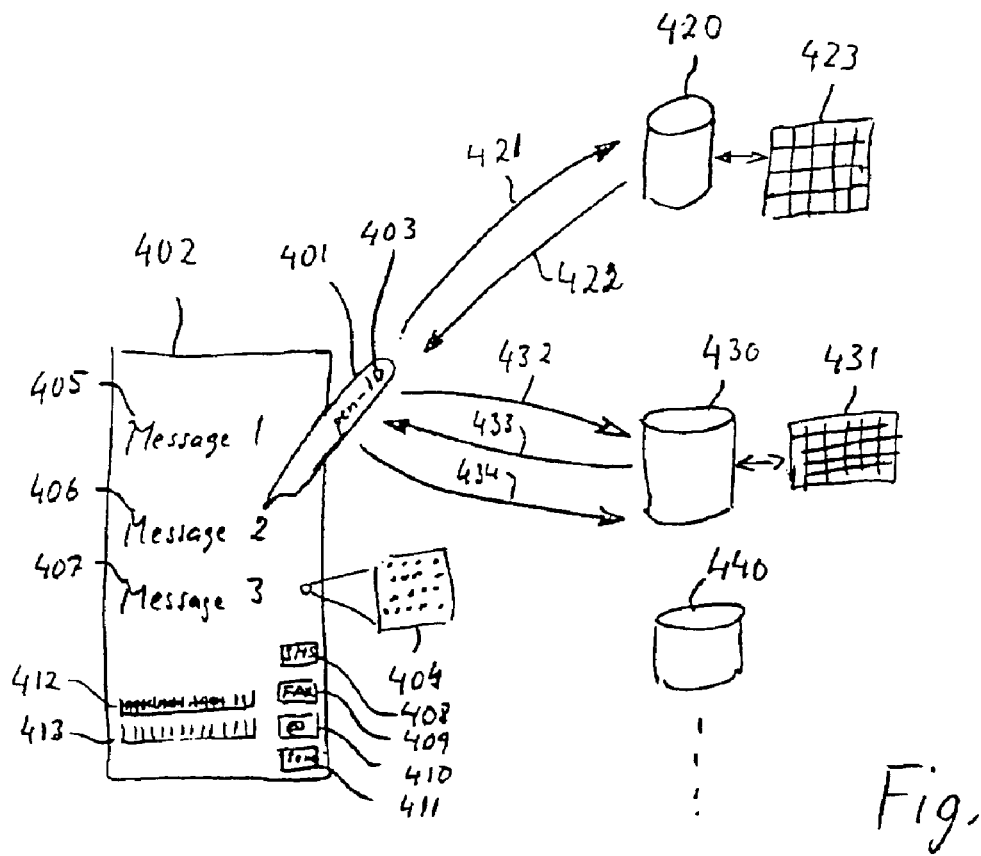
FIG. 6 is a schematic diagram of an information handling system according to the invention.

FIG. 6 discloses an embodiment of an information handling system in which the present invention may be used. The system comprises a handheld device 401, which in this case is a combined ordinary pen with a stylus that may dispense inc or other material leaving a permanent trace on a paper 402. The pen may also comprise an optical sensor for imaging a pattern of dots or markings provided on the paper and generating coordinates for the position of the pen on the paper. The coordinates are calculated by a microprocessor arranged in the pen and are stored in a memory. The pen is provided with an identification number 403, called pen-ID, which may be a manufacturing number hard coded in the memory or otherwise assigned to the pen. The pen-ID may not be changed. The pen is further described with reference to FIG. 8.

The paper is provided with an absolute position coding pattern over the entire page as depicted by the enlargement 404. The paper is provided with information 405, such as "Message 1", "Message 2", "Message 3", which may be entered by the pen ("Message 1" and "Message 2") or may be preprinted on the paper ("Message 3"). Furthermore, there is arranged boxes 408, 409, 410 and 411, which are labeled SMS, FAX, @ and SEND. Finally, there are lines 412 and 413 provided with demarcation lines between which letters or numerals may be written.

The pen is arranged to write on the paper, for example "Message 1" and "Message 2". During the writing, the pen senses the dots of the pattern and calculates position coordinates for the pen at regular time intervals, such as 100 times per second. Thus, a digital trace of the pen movement is formed in the pen. The pen may also, in addition to position information and time information, store information about the pressure between the pen and paper and the inclination and rotation of the pen in relation to the paper. The information is stored as a set of coordinates, which may be converted to a vector format.

Information is also entered at the lines 412, 413, as shown "ga@cpen.com". Such information may be e-mail addresses, telefax numbers, SMS telephone number etc. The information may also contain text to be included in the subject line of an e-mail.

Then, a hyperline is drawn from the box 410 into the page area 402, in order to qualify the information to be sent as an e-mail.

Finally, a hyperline is drawn from the send box 411 to the page area 402. The line portion in the send box indicates to the pen that a send operation should be performed, and the hyperline indicates that the send operation should be performed on the information included at page 402. The previous hyperline indicates that the send operation should be an e-mail.

The pen is in contact with the Internet via some suitable means not shown at FIG. 6, but further explained in connection with FIG. 8. A send action involves that the pen 403 sends a data packet comprising coordinates for identification of the owner of the particular coordinates for which the service should be performed, as indicated by line 421. In the present case, coordinates obtained from the box 410 is sent together with the pen-ID, to a server 420 at internet which is located at a specific IP address, which is stored in the pen. The coordinates from box 410 is interpreted by the server, by means of a database table 423, as belonging to an e-mail operator, such as Telia AB. Then, the server returns an IP address for Telia AB to the pen, as shown by line 422.

In the next step, the pen sends a request, as indicated by line 432, including the pen-ID, to the server 430 for Telia AB, the address of which was obtained in the step outlined above. The server 430 looks in a database 431 in order to determine if the pen-ID has authorization and a contract for the requested service and sets up a receiving program, and finally sends an acknowledgement signal together with some information about which information should be transmitted, such as format, size etc. Then, the pen prepares a data packet, with the information, in this case the e-mail address of the recipient, any information to be included in the subject line, and the very information, which may be graphical etc, which is sent to the Telia server 430 as indicated with line 434. The Telia server performs its servicing and transmits the e-mail to the recipient.

In the situation with an e-mail, some of the above actions may be dispensed with, so that the message may pass directly from the pen to the e-mail service provider.

In another situation, the page 402 may be an advertisement, for example for company A, in a newspaper or magazine. In this case, the send button comprises information about the advertisement owner A. As indicated above, the send button is selected from the send button region which comprises 4 503 599 627 370 496 different send buttons. That many different companies may obtain its own send button.

The process is the same as indicated above, except that the first message sent according to line 421 comprises the send button coordinates and the pen-ID. The server 420 includes a register over send button owners in database 423 and returns the IP address of the advertisement owner, i.e. company A. Then, the pen contacts the company A server and sends the information as requested by that server.

Figure 8:
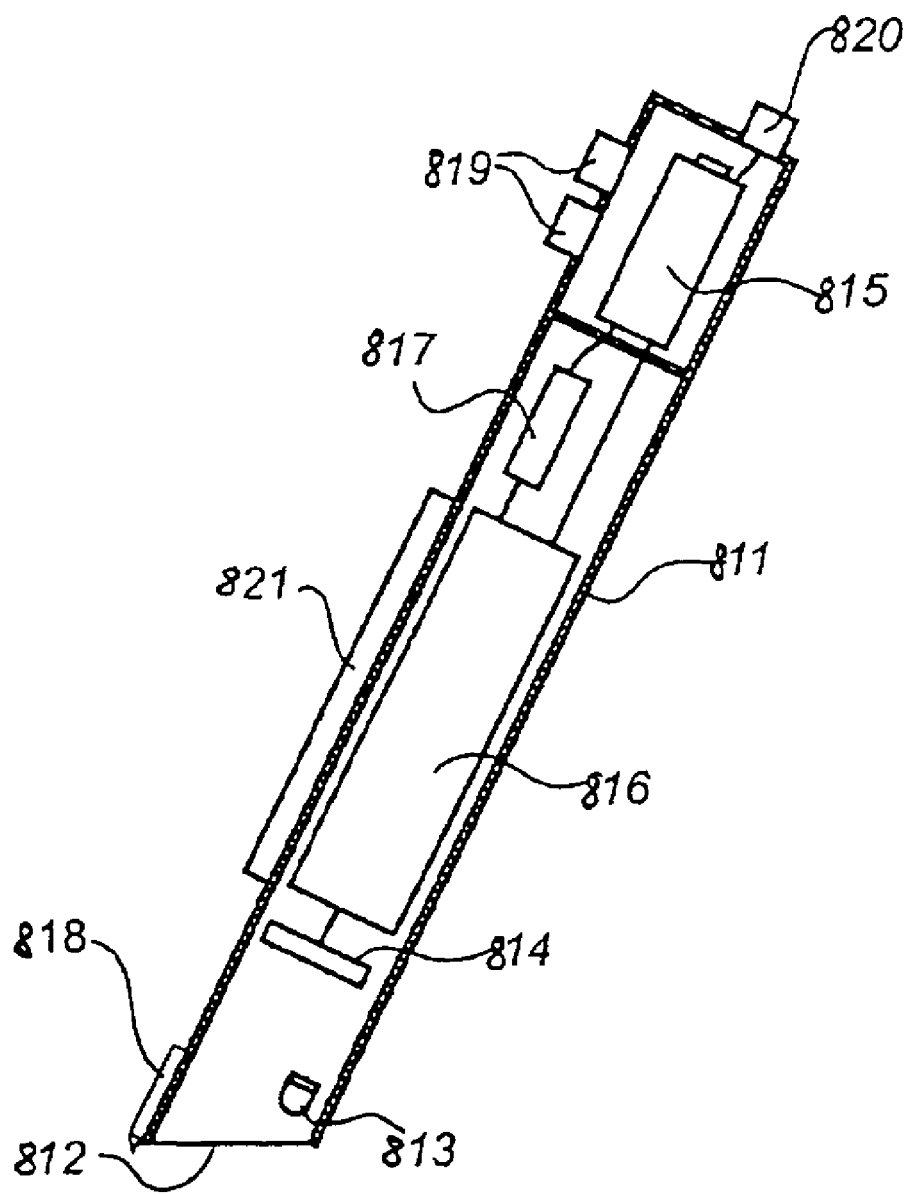
FIG. 8 is a schematic diagram of a handheld device to be used according to the present invention.

A handheld device that may be used according to the invention is shown in FIG. 8. The handheld device, which also is called a pen above, comprises a housing 811 with an opening 812 at one end thereof. A light source 813, such as one or several LEDs illuminates the surface below the opening 512, normally the paper surface. An optical sensor 814 is arranged to sense dots or markings arranged on the paper visible through opening 812. There is normally an optical system such as lenses or mirrors. The sensor is a two-dimensional array and delivers an image signal to a microprocessor 816 comprising a memory 817. A power source such as a battery 815 is arranged to power the pen. A stylus 818 is arranged adjacent the opening 812 in order to leave a trace on the paper as an ordinary pen. The stylus may dispense inc which is invisible by infrared light, and the LEDs and the sensor may operate at IR light, which means that the stylus trace do not interfere with the sensing of the coding pattern or dots. The pen may be provided with one or several buttons 819 in order to operate the pen, such as on-off switch. Moreover, the pen may be provided with a display screen 821.

In order to transmit the information from the pen, it is provided with a short-range radio transmitter and receiver 820, which may establish a connection with an adjacent computer or mobile telephone and further to Internet. Such a short-range radio communication system is manufactured by Ericsson Radio System AB, a Swedish company, under the trademark BLUETOOTH. Other communication systems may be used as well, such as IR communication, or wire.

The pen may accumulate information in the memory while not being connected to Internet and transmit such information when connection is established, for example during night time, when the pen is placed in a cradle. The information in the pen may be erased upon transmission, or may be maintained until a delete order is given by the user.

As is understood by the examples given above, the data transfer structure is very flexible and makes it possible to use a single server with associated database, for keeping track of different owners of certain services included in the system, while this server is revealed from the heavy traffic of the complete information transfer.

In the above examples, a hyperline has been used for interconnecting or associating information with other information, services or operations. In the above examples, association has been used for defining which regions and areas that should be included in a sending operation. A hyperline is formed comprising coordinates from several different areas in one and the same line. The pen comprises a pressure sensor which indicates when the pen is in contact with a support and a line or a trace is formed. It is only when the pressure sensor is activated and the pen is in contact with the support that the pen senses and registers coordinate positions and at the same time a line is drawn on the support by the pen. This physical line is continuous and extends over the surface of the support, such as across two overlapping pages of paper. The digital representation of this continuous line comprises one or several discontinuities when the pen passes over a borderline between non-continuous areas. Thus, a hyperline is a digital representation of a physically continuous line, in which the digital representation comprises one or several discontinuities.

Thus, a single line or a continuous trace comprises coordinates from several different regions and/or areas. One example of a hyperline is the above-mentioned send line, which starts or ends in a send box. The send box indicates that a send action should be undertaken by the pen. The send program of the pen may be arranged to include coordinates from each region or area of the hyperline, in the information packet generated. The coordinates from the send box indicates that the pen is to initiate a send function to a specific preprogrammed IP address in which a server is positioned, and which comprises a database over the different subscribers of the system each defined by the coordinates of the send box. The coordinates from the remaining regions or areas are used by an application or a program in the server or computer which is to receive the information, and indicates to this server or computer which program is to be started, such as an e-mail program.

A hyperline may be used in other occasions than as a send line. Thus, a hyper line may be used for qualifying certain information.

One example is that a user's messages jotted down at a notebook page is to be sent by an e-mail to a recipient. The user has a business card from the receiver with the personal coordinates of the business card owner at the backside. Instead of writing an e-mail address, the user positions the backside of the business card on the note book page and draws a hyperline from the business card to the note book page so that the hyperline registers coordinates from both areas. When this information is analyzed by an e-mail program, which is to send the information, the e-mail program looks for a hyperline which may give information about an e-mail address and finds this hyperline. The program sends a question or request to an internet server about which person the business card coordinates belong to and receives the business card owners e-mail address in return.

Several note book pages may be linked by a hyperline, for example by drawing a hyperline across both pages or several pages arranged beside each other.

The user may have predefined a number of e-mail addresses in certain personal areas in the users private area, so that a hyperline from such a predefined area results in that the program searches in a specific database after the preprogrammed e-mail address. Also the pen-ID may be used for personal information, such as the fact that all e-mail communication should be sent as a copy to the pen-owners e-mail address as a confirmation.

The user may also have preprogrammed other operations which by means of a hyperline may be associated with information in different manners. A user may have stored all his previous notes at a private personal computer and wants to find a certain page. He has retained a small piece of said page and puts it beside the function area which he has predefined as a search function. A hyperline between the function area and said piece establishes an association between the function area and the note book page. The search program can now easily locate the page by means of the coordinates of said piece and may display it on the screen. This search function may be extended to find information stored at a server somewhere on Internet, i.e. information floating in the "cyber space".

Further examples of the search function is the following: In an article the author gives a reference list at the end of the article, where each reference is coded with an absolute position coding pattern according to the present invention. By drawing a hyperline between the readers business card and the coding pattern of the reference, an association is generated which may result in that the reference is sent to the business card owner via e-mail. By arranging an absolute position coding pattern adjacent each author, such a hyperline may involve that predetermined information about the author is sent to the business card owner.

An association may be generated between more than two areas, such as described above. Thus, a send request may comprise a send box from a send region, one or several note book pages from a note book region, personal information from a business card region and payment information from a payment region, etc.

Association may also be used for qualifying the information to be sent. If a hyperline passes a secret area, this means that the pen, when analyzing the hyperline, interprets that the information to be sent should be encrypted by a predefined algorithm. Other operations may also be qualified by hyperlines, such as the fact that the information is to be character recognized and possibly subsequently translated into another language. The association may be interpreted by the pen or by the program which handles the information transmitted by the pen.

If an association is interpreted by the pen, it may be used for activating different operation modes of the pen, such as enabling encryption as mentioned above.

The present invention has been described with an absolute position coding pattern comprising dots arranged according to a rectangular raster. Any type of absolute position coding pattern may be used with the invention as soon as such pattern may be arranged adjacent each other so that a discontinuity is defined by a single line. However, the pattern also needs to have a portion with continuous coordinates so that the discontinuity may be discovered as something which is out of order. In this way, the handheld device can easily recognize the hyperline and immediately undertake action, if that was the intention. Moreover, a hyperline may easily be discovered in a message or a piece of information which normally have continuous coordinates.

Hereinabove, the invention has been described with reference to several embodiments of the invention. A skilled person realizes that the features included in the different embodiments may be combined in other combinations than the above-mentioned combinations and such combinations are intended to be within the scope of the invention. The invention is only limited by the appended claims.

The invention claimed is:

1. A method for generating an association with regard to information, which is arranged on at least one support provided with an absolute position coding pattern, by means of a handheld device arranged to sense said absolute position coding pattern, comprising:
   passing said handheld device over said support for sensing said absolute position coding pattern;
   sensing when said handheld device passes over a discontinuity in the absolute position coding pattern; and
   interpreting said discontinuity as an association regarding the information present on said supports,
   wherein said support comprises a first area in which said absolute position coding pattern codes continuous first coordinates, and that said information is provided on said first area and is connected to said first coordinates, and said support comprises a second area provided with an absolute position coding pattern which codes second coordinates which are discontinuous with said first coordinates; passing said handheld device in a single movement from one area to the other area, for sensing said discontinuity.

2. The method as claimed in claim 1, in wherein said association involves that a predetermined action is undertaken on said information.

3. The method as claimed in claim 2, wherein said action comprises sending the information as a message, such as an e-mail, SMS or fax, to a recipient.

4. The method as claimed in claim 3, wherein said recipient is defined in the information.

5. The method as claimed in claim 3, wherein said recipient is defined by said association.

6. The method as claimed in claim 5, wherein said recipient is defined by the coordinates in said second area, which are connected to information about the recipient.

7. The method as claimed in claim 2, wherein said action comprises storing said information in a predetermined location in a computer system.

8. The method as claimed in claim 7, wherein said location is a predetermined folder in a personal computer defined by the coordinates of the second area.

9. The method as claimed in claim 2, wherein said action comprises an operation to be performed on said information, such as encryption or character recognition.

10. The method as claimed in claim 1, wherein said association involves a qualification of the information.

11. The method as claimed in claim 10, wherein said qualification is selected from the group comprising: underline, color, line width, yellow mark, secret, and personal.

12. The method as claimed in claim 11, wherein the information which is qualified is selected by passing said handheld device from said second area, to said first area and encircling said information to be qualified.

13. The method as claimed in claim 11, wherein the information which is qualified is selected by passing said handheld device from said second area, to said first area and encircling said information to be qualified and back to said second area.

14. The method as claimed in claim 2, wherein said first area comprises first information and that said second area comprises second information, and that said association involves that said first and second information are interconnected to a single piece of information.

15. The method as claimed in claim 2, characterized in providing at least a further area comprising coordinates which are discontinuous with said first and second coordinates, and passing said handheld device in a single movement over all areas.

16. The method as claimed in claim 15, wherein said further area comprises a link to personal information, such as a v.card file.

17. A system for generating an association with regard to information, which is arranged on at least one support provided with an absolute position coding pattern, by means of a handheld device arranged to sense said absolute position coding pattern, comprising:
   a means for sensing when said handheld device passes over a discontinuity in the absolute position coding pattern; and
   interpretation means for interpreting said discontinuity as an association regarding the information present on said support,
   wherein said support comprises a first area in which said absolute position coding pattern codes continuous first coordinates, and that said information is provided on said first area and is connected to said first coordinates, and in that said support comprises a second area provided with an absolute position coding pattern which codes second coordinates which are discontinuous with said first coordinates; which discontinuity is sensed by the handheld device when it passes in a single movement from one area to the other area, for sensing said discontinuity.

18. The system as claimed in claim 17, wherein said association involves that a predetermined action is undertaken on said information.

19. The system as claimed in claim 18, wherein said action comprises sending the information as a message, such as an e-mail, SMS or fax, to a recipient.

20. The system as claimed in claim 19, wherein said recipient is defined in the information.

21. The system as claimed in claim 19, wherein said recipient is defined by said association.

22. The system as claimed in claim 21, wherein said recipient is defined by the coordinates in said second area, which are connected to information about the recipient.

23. The system as claimed in claim 18, wherein said action comprises storing said information in a predetermined location in a computer system.

24. The system as claimed in claim 23, wherein said location is a predetermined folder in a personal computer defined by the coordinates of the second area.

25. The system as claimed in claim 19, wherein said action comprises an operation to be performed on said information, such as encryption or character recognition.

26. The system as claimed in claim 18, wherein said first area comprises first information and that said second area comprises second information, and that said association involves that said first and second information are interconnected to a single piece of information.

27. The system as claimed in claim 18, providing at least a further area comprising coordinates which are discontinuous with said first and second coordinates, and passing said handheld device in a single movement over all areas.

28. The system as claimed in claim 27, wherein said further area comprises a link to personal information, such as a v.card file.

29. The system as claimed in claim 17, wherein said association involves a qualification of the information.

30. The system as claimed in claim 29, wherein said qualification is selected from the group comprising: underline, color, line width, yellow mark, secret, and personal.

31. The system as claimed in claim 30, wherein the information which is qualified is selected by passing said handheld device from said second area, to said first area and encircling said information to be qualified.

32. The system as claimed in claim 30, wherein the information which is qualified is selected by passing said handheld device from said second area, to said first area and encircling said information to be qualified and back to said second area.

* * * * *